US012364650B2

(12) United States Patent
Ferrill

(10) Patent No.: US 12,364,650 B2
(45) Date of Patent: Jul. 22, 2025

(54) CHEW TOYS FOR CHILDREN

(71) Applicant: Purdue Research Foundation, West Lafayette, IN (US)

(72) Inventor: Hannah Maureen Ferrill, Hobart, IN (US)

(73) Assignee: Purdue Research Foundation, West Lafayette, IN (US)

( * ) Notice: Subject to any disclaimer, the term of this patent is extended or adjusted under 35 U.S.C. 154(b) by 172 days.

(21) Appl. No.: 18/478,049

(22) Filed: Sep. 29, 2023

(65) Prior Publication Data

US 2024/0122813 A1 Apr. 18, 2024

Related U.S. Application Data

(63) Continuation of application No. 17/120,713, filed on Dec. 14, 2020, now abandoned.

(60) Provisional application No. 62/947,106, filed on Dec. 12, 2019.

(51) Int. Cl.
*A61J 17/02* (2006.01)
*A61J 17/00* (2006.01)

(52) U.S. Cl.
CPC ........... *A61J 17/02* (2013.01); *A61J 17/1011* (2020.05); *A61J 17/1012* (2020.05)

(58) Field of Classification Search
CPC ........................ A61J 17/00–113; A01K 15/026
See application file for complete search history.

(56) References Cited

U.S. PATENT DOCUMENTS

| | | | | | |
|---|---|---|---|---|---|
| D171,950 | S * | 4/1954 | Moore | D21/408 | |
| 5,160,344 | A * | 11/1992 | Werton | A61J 17/02 | 606/234 |
| D368,965 | S * | 4/1996 | Nakata | D24/194 | |
| 2004/0093033 | A1* | 5/2004 | Desousa | A61J 17/101 | 606/235 |
| 2004/0139720 | A1* | 7/2004 | Willinger | A01K 15/026 | 59/85 |
| 2009/0069848 | A1* | 3/2009 | Marcus | A61J 17/02 | 606/235 |

* cited by examiner

*Primary Examiner* — Todd J Scherbel
(74) *Attorney, Agent, or Firm* — Hartman Global IP Law; Gary M. Hartman; Domenica N. S. Hartman

(57) ABSTRACT

A toy with a ring-shaped body having multiple sections each forming a portion of the ring-shaped body and each having a tubular base portion. At least a first tab projects radially outward from the tubular base portion of a first section of the multiple sections. Surface features protrude from at least one of the first tab and the tubular base portion of at least one of the multiple sections. At least a first pressure sensor is embedded in the first tab and operates to activate a first electrical device in response to pressure applied to the first tab exceeding a pressure threshold. Activation of the first electrical device produces light, or sound, or vibrates.

1 Claim, 3 Drawing Sheets

CHEW TOYS FOR CHILDREN

CROSS-REFERENCE TO RELATED APPLICATIONS

This is a continuation patent application of co-pending U.S. patent application Ser. No. 17/120,713 filed Dec. 14, 2020, which claims the benefit of U.S. Provisional Application No. 62/947,106, filed Dec. 12, 2019. The contents of these prior applications are incorporated herein by reference.

BACKGROUND OF THE INVENTION

The present invention generally relates to children's toys. The invention particularly relates to toys configured to promote the personal development of children with specific developmental needs, such as children including newborns with Down syndrome.

Many toys designed for young children are intended to promote a child's development in areas such as speech, fine motor skills, physical movement, thinking skills, etc. However, there is a lack of toys intended for children with specific developmental needs, such as children with Down syndrome.

Down syndrome is a condition in which a person has an extra chromosome (chromosome 21). This extra chromosome changes how a baby's body and brain develop, which can cause lifelong mental and physical challenges for the individual. Babies with Down syndrome may face additional developmental challenges and typically take longer to achieve certain developmental milestones such as turning over, sitting, standing, and walking. These children may attend therapeutic services to improve their physical and intellectual abilities during development, including speech, occupational, and physical therapy. However, it is believed that such children could further benefit if toys were available that were specifically configured to promote the children's development.

BRIEF DESCRIPTION OF THE INVENTION

The present invention provides toys suitable for promoting development of children, including but not limited to children including newborns with Down syndrome.

According to one aspect of the invention, a toy includes a ring-shaped body having multiple sections each forming a portion of the ring-shaped body and each having a tubular base portion. At least a first tab projects radially outward from the tubular base portion of a first section of the multiple sections. Surface features protrude from at least one of the first tab and the tubular base portion of at least one of the multiple sections. At least a first pressure sensor is embedded in the first tab and operates to activate a first electrical device in response to pressure applied to the first tab exceeding a pressure threshold. Activation of the first electrical device produces light, or sound, or vibrates.

Technical effects of the toy described above preferably include the ability to promote a child's development by having the child chew on and play with the toy.

Other aspects and advantages of this invention will be appreciated from the following detailed description.

DETAILED DESCRIPTION OF THE INVENTION

Figure 1:
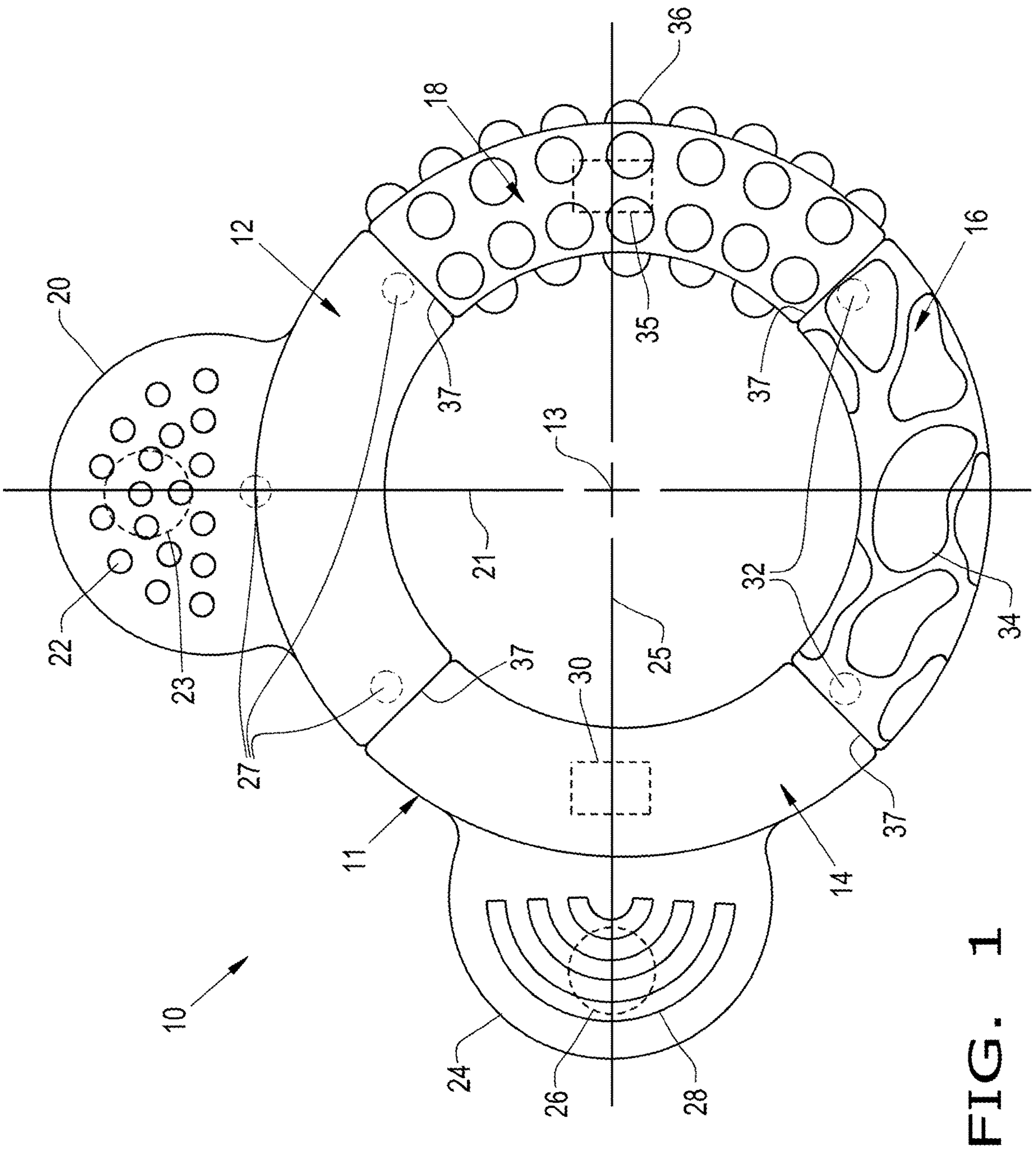
FIGS. 1 through 3 show various views of a toy in accordance with certain nonlimiting aspects of the present invention.
Figure 2:
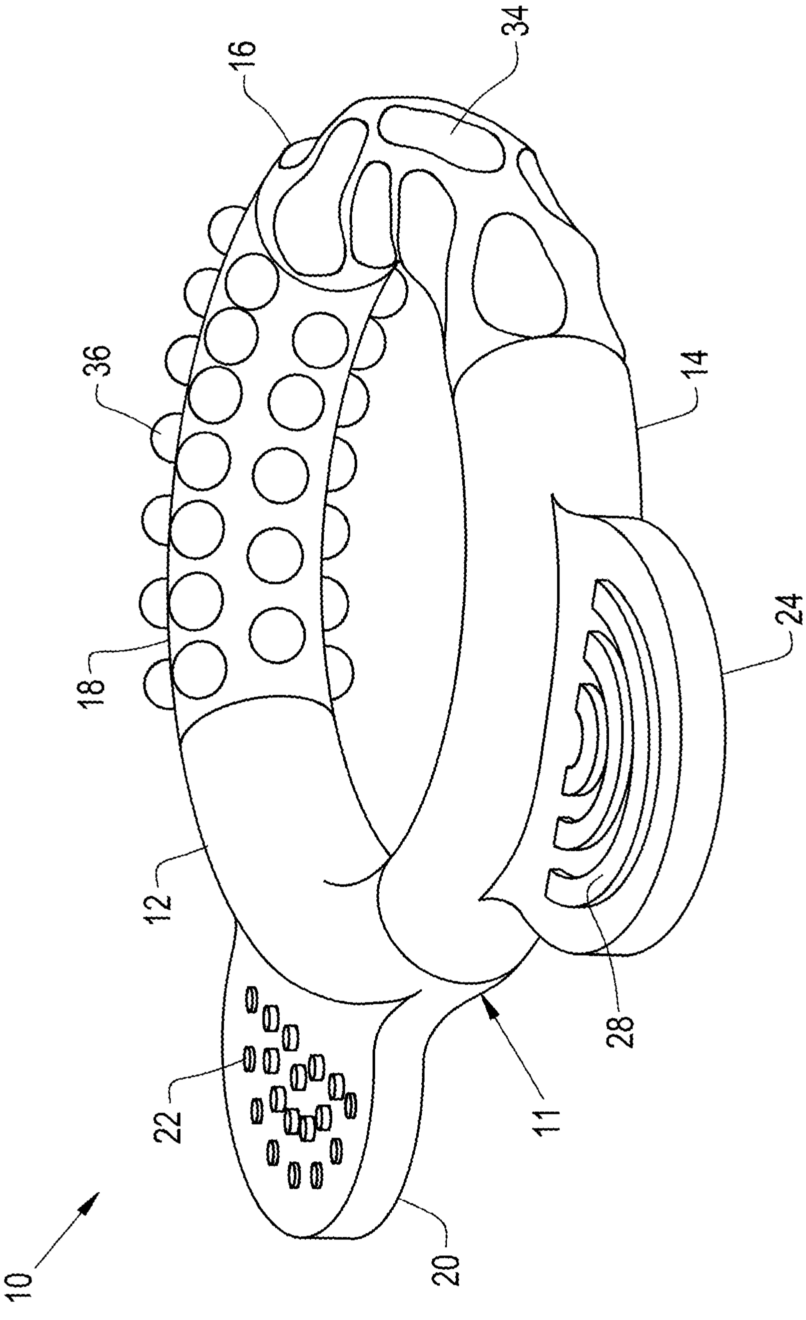
Figure 3:
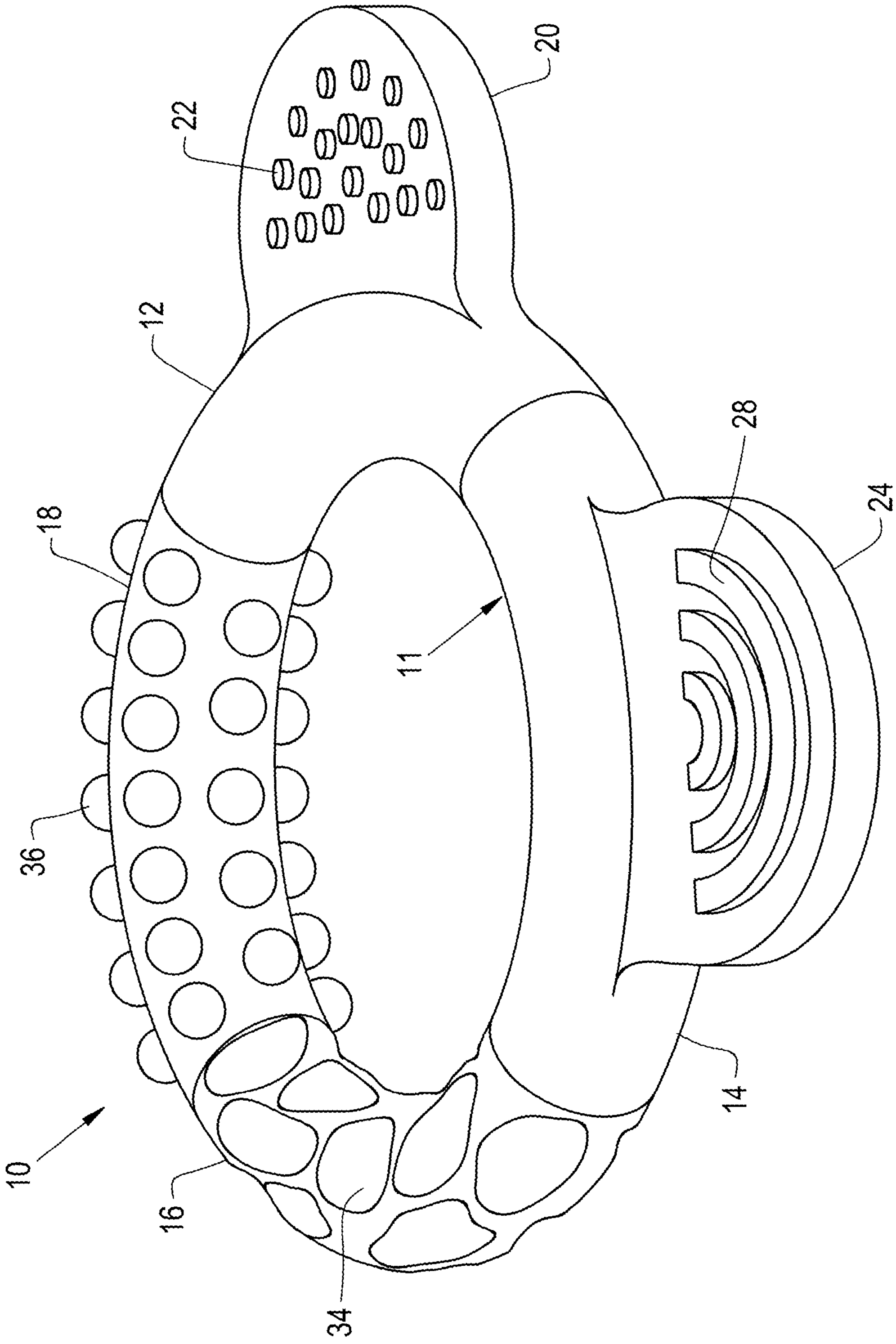

FIGS. 1 through 3 show a nonlimiting embodiment of a toy 10 configured to promote the development of young children, including but not limited to children including newborns with Down syndrome. In a preferred embodiment, a child may chew on the toy 10 and thereby promote strengthening of the child's jaw and hand (e.g., grip) muscles and improving tongue control. It is believed that improvements in jaw muscle tone and tongue control may benefit a child in speech development, nursing, and teething, especially a child with Down syndrome.

The toy 10 includes a ring-shaped body 11 formed by multiple sections (sectors). In the nonlimiting embodiment shown, the body 11 of the toy 10 is generally toroid-shaped and the multiple sections are generally toroid sectors. The nonlimiting embodiment of the body 11 represented in the drawings has generally constant major and minor radii from a central axis 13 and comprises four arcuate sections 12, 14, 16, and 18, each forming a 90-degree quadrant of the toroid shape of the body 11 and each having a generally arcuate-shaped tubular base portion having a circular cross-section, though other shapes and fewer and more sections are foreseeable. Each section 12, 14, 16, and 18 is represented as being different from the others. In the embodiment shown, the sections 12, 14, 16, and 18 include different features specifically intended to maintain a child's attention and/or promote its physical and/or mental development.

In the nonlimiting embodiment shown in the drawings, two generally flat or planar, semicircular tabs 20 and 24 project from the tubular base portions of an immediately adjacent pair of the sections 12 and 14 (hereinafter, the first and second sections 12 and 14) in generally radially outward directions of the body 11 of the toy 10. In contrast, the remaining sections 16 and 18 (hereinafter, the third and fourth sections 16 and 18) lack any radially-projecting tabs. The tabs 20 and 24 are represented as each having a partial disk-shape with a thickness (parallel to the axis 13) between two generally planar surfaces that is less than the maximum width of the tab 20 and 24 in the plane of the toy 10 (perpendicular to its axis 13). Additionally, each tab 20 and 24 is represented as generally symmetrical about a radial 21 or 25 of the body 11. These tabs 20 and 24 not only provide a surface for a child to chew on, but also may function to activate certain features of the toy 10, including but not limited to one or more electrical devices. For example, the tab 20 projecting from the first section 12 may include a pressure sensor 23 (FIG. 1) that activates one or more battery-powered light sources 27 embedded within the first section 12 if the pressure sensed by the sensor 23 exceeds a predetermined pressure threshold, such as when a child chews on or squeezes the tab 20. In this instance, the first section 12 is at least semi-transparent to allow light emitted from the light sources 27 to be seen by the child. Upon activation, the light sources 27 may each individually emit light of different colors and/or changing colors, may be continuous or flashing, and may remain lighted for a predetermined amount of time or while adequate pressure is maintained on the tab 20.

Similarly, the tab 24 may include a pressure sensor 26 (FIG. 1) that activates a battery-powered sound-emitting device 30 (referred to hereinafter as a speaker) embedded within the second section 14 in response to the pressure sensed by the sensor 26 exceeding a pressure threshold, such as when a child chews on or squeezes the tab 24. The speaker 30 may produce various sounds, music, or audio recordings for a predetermined amount of time or while adequate pressure is maintained on the tab 20.

In addition or as an alternative to the above, the tabs 20 and 24 may be configured to activate features within sections 12, 14, 16, and/or 18 of the body 11 other than those from which they directly project. For example, activation of the pressure sensor 23 in the tab 20 may also activate additional light sources 32 in the third section 16 of the body 11, and activation of the pressure sensor 26 in the tab 24 may also activate a second speaker 35 in the fourth section 18 of the body 11. Further, activation of the pressure sensor 23 and/or 26 in either tab 20 or 24 could activate some or all of the features associated with one or more other sections 12, 14, 16, and 18 of the toy 10. The toy 10 may also include features other than devices that produce light and sound. For example, a battery-powered vibrating device could be installed in place of any one or more of the light sources 27 and 32 and speakers 30 and 35 so that the toy 10 vibrates, which may assist in the teething process.

Each individual section 12, 14, 16, and 18 may be formed of the same material or different materials, may have the same or different rigidity or hardness, may be at least semi-transparent or opaque, and may be various colors. In addition, each of the individual sections 12, 14, 16, and 18 may have entirely smooth surfaces, uneven surfaces, and/or include surface features such as protrusions or recesses. In the embodiment represented in the drawings, the tubular base portions of the second and fourth sections 14 and 18 are opaque, the tubular base portions of the first and third sections 12 and 16 are semi-transparent, and the surfaces of the tubular base portions of the first, second and fourth sections 12, 14, and 18 are smooth and formed of a relatively rigid material so that each has and is able to maintain a constant cross-sectional circular shape, whereas the tubular base portion of the third section 16 may be formed by a material that is more pliable and elastic than the first, second and fourth sections 12 and 14, with the result that the tubular base portion of the third section 16 tends to have a variable and likely a wavy or rippled surface 34. The sections 12, 14, 16, and 18 can be separately manufactured and assembled to create the toroidal shape of the body 11, so that each adjacent pair of sections 12, 14, 16, and 18 is separated by a wall 37 and each section 12, 14, 16, and 18 may define an enclosed and optionally sealed internal cavity. For example, the internal cavity within the tubular base portion of the third section 16 may be sealed and contain a silicone gel or the like, so that the third section 16 and particularly its tubular base portion is pliable and deformable. If placed in the freezer, the third section 16 can be used to assist with teething pain and/or provide a difference in textures and surfaces for enhanced baby stimulation.

The tab 20 of the first section 12 is shown as including an array of circular protrusions or nubs 22 and 36 protruding from at least one of its oppositely-disposed planar surfaces, the tab 24 of the second section 14 is shown as including an array of semicircular ribs 28 protruding from at least one of its oppositely-disposed planar surfaces, and the fourth section 18 is shown as including an array of circular protrusions or nubs 36 protruding from the surface of its tubular base portion. Such surface features may be configured to maintain a child's attention, promote chewing, alleviate discomfort associated with teething, and/or provide other benefits.

Notably, the nonlimiting embodiment represented in the drawings is merely exemplary, and other configurations are foreseeable. As nonlimiting examples, the toy 10 could have shapes and sizes other than those shown (e.g., a noncircular ring in the shape of a rectangle, pentagon, etc. or a solid (i.e., not ring-shaped) body), could include more or fewer sections, and could include more or fewer tabs of various shapes.

Therefore, while the invention has been described in terms of a particular embodiment, it should be apparent that alternatives could be adopted by one skilled in the art. For example, the toy 10 and its components could differ in appearance and construction from the embodiments described herein and shown in the drawings, functions of certain components of the toy 10 could be performed by components of different construction but capable of a similar (though not necessarily equivalent) function, and various materials could be used in the fabrication of the toy 10 and/or its components. Accordingly, it should be understood that the invention is not necessarily limited to any embodiment described herein or illustrated in the drawings. It should also be understood that the phraseology and terminology employed above are for the purpose of describing the nonlimiting embodiment shown in the drawings, and do not necessarily serve as limitations to the scope of the invention. Therefore, the scope of the invention is to be limited only by the following claims.

The invention claimed is:

1. A toy comprising:

a ring-shaped body comprising multiple sections, each section of the multiple sections forming a portion of the ring-shaped body and having a tubular base portion, each adjacent pair of the multiple sections being separated by a wall, each of the multiple sections having an enclosed internal cavity defined therein, the enclosed internal cavities being separated by the walls between the adjacent pairs of the multiple sections;

at least a first tab projecting radially outward from the tubular base portion of a first section of the multiple sections;

at least a second tab projecting radially outward from the tubular base portion of a second section of the multiple sections;

surface features protruding from at least one of the first tab and the tubular base portion of at least one of the multiple sections; and at least a first pressure sensor embedded in the first tab, the first pressure sensor operating to activate a first electrical device in response to pressure applied to the first tab exceeding a pressure threshold, wherein activation of the first electrical device produces light, sound, or vibrations;

wherein:

the multiple sections of the ring-shaped body are four arcuate sections each forming a 90-degree quadrant of the ring-shaped body;

the tubular base portions of the first and second sections are immediately adjacent to each other on the ring-shaped body so as to form a first half of the ring-shaped body; and the tubular base portions of third and fourth sections of the multiple sections are immediately adjacent to each other on the ring-shaped body so as to form a second half of the ring-shaped body and do not comprise tabs that project radially outward from the tubular base portions thereof.

* * * * *